United States Patent [19]

Hollewed et al.

[11] Patent Number: 4,811,387

[45] Date of Patent: Mar. 7, 1989

[54] HOLDER AND CREDIT-CARD UNLATCHING MECHANISM FOR A HAND-HELD TELEPHONE

[76] Inventors: Edward J. Hollewed, 157 Tupelo, Naperville, Ill. 60540; John D. Goeken, 1444 W. Renwick, Plainfield, Ill. 60544; Jerome L. Oldani, 2141 Rockwell, Aurora, Ill. 60506

[21] Appl. No.: 138,182

[22] Filed: Dec. 28, 1987

[51] Int. Cl.[4] .......................................... H01M 11/00
[52] U.S. Cl. .................................... 379/144; 235/482
[58] Field of Search ................. 379/144, 51, 56, 58; 235/482, 483, 375

[56] References Cited

U.S. PATENT DOCUMENTS

| | | | |
|---|---|---|---|
| 3,938,090 | 2/1976 | Borison et al. | 379/91 |
| 4,523,087 | 6/1985 | Benton | 235/379 |
| 4,587,379 | 5/1986 | Masuna | 379/91 |
| 4,634,845 | 9/1987 | Hale et al. | 235/350 |
| 4,672,661 | 6/1987 | Clark, Jr. et al. | 379/144 |
| 4,727,569 | 2/1988 | Kutrieb et al. | 379/58 |
| 4,759,056 | 7/1988 | Akiyama | 379/197 |

*Primary Examiner*—Robert Lev

*Attorney, Agent, or Firm*—John A. Odozynski

[57] ABSTRACT

In conjunction with a hand-held, credit-card telephone for use aboard, for example, commerical aircraft, a telephone holder and credit-card unlatching mechanism ("CCUM"). The holder includes a holder channel of generally longitudinal, stepwise construction. The holder also includes a face plate with a vertical slot for the insertion of a credit card. A butt plate, secured to one end of the holder channel, and the CCUM, which is secured to the other end of the holder channel, together form, with the holder channel, a telephone-receiving cavity in which the telephone is secured when not in use.

The CCUM itself includes a latch plate attached to the holder channel and exhibits a longitudinal slot in alignment with the vertical slot in the face plate. A latching mechanism is secured to the holder channel and operates to selectively, in response to the insertion of a credit card, latch or unlatch the telephone from the telephone-receiving cavity. A credit-card guide is attached to the latch plate and disposed between the latch plate and a latch-release plate of the latching mechanism for guiding the travel of a credit card that has been inserted into the slot.

44 Claims, 2 Drawing Sheets

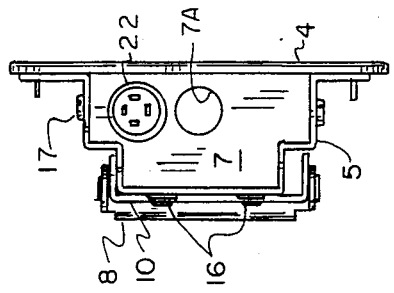
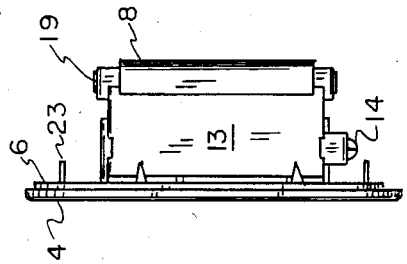
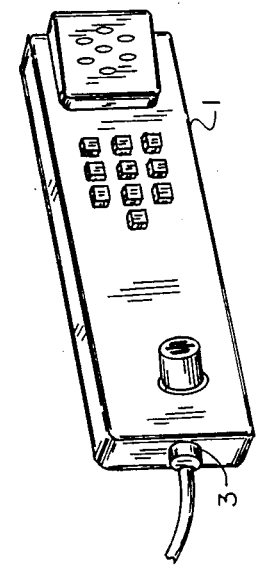
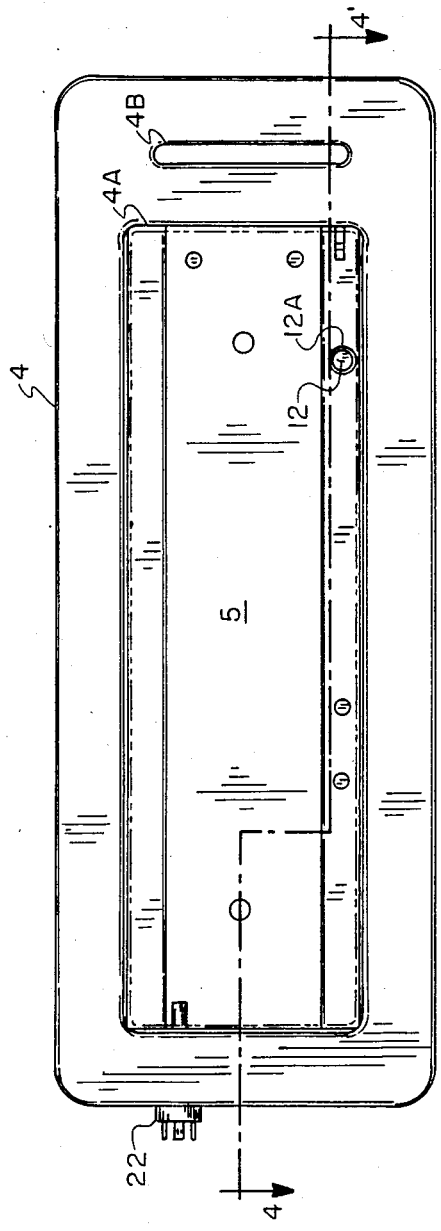
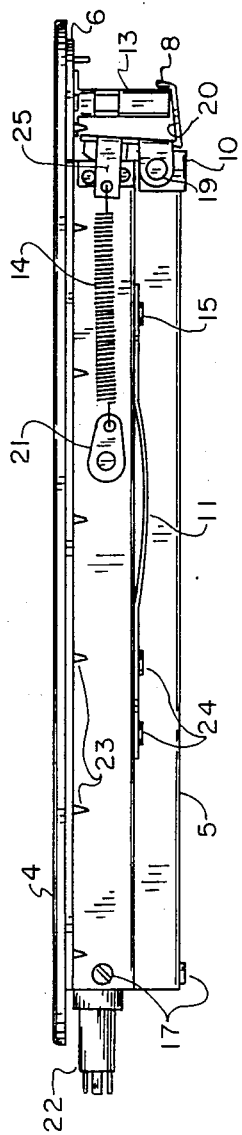
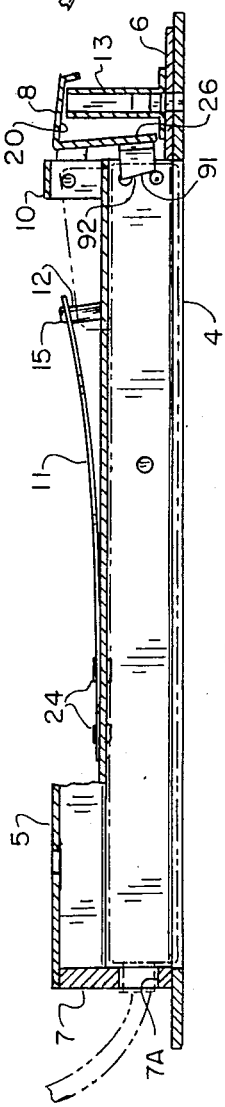

HOLDER AND CREDIT-CARD UNLATCHING MECHANISM FOR A HAND-HELD TELEPHONE

CROSS REFERENCE TO A RELATED APPLICATION

Cross Reference is made to the related U.S. patent application entitled, "Hand-Held Pay Telephone and Holder," Ser. No. 138,172 filed on 12/27/87, assigned to the same assignee, and by the same inventors as this Application.

FIELD OF THE INVENTION

The present invention relates to the field of telephone pay stations and, more particularly, to telephone pay station apparatus adapted for mounting in the passenger area of a vehicle such as a commercial aircraft.

BACKGROUND OF THE INVENTION

Public pay telephones were introduced in the 1880s. In general, operation of such pay telephones required the deposit of a coin in order to unlock some mechanism, for example, the crank with which the user signalled the operator or a sliding door in front of the mouthpiece. On occasion, the entire telephone was enclosed in a locked box that could be opened only with the deposit of a coin, qua key. One arrangement reversed the usual scheme and enclosed the telephone in a booth having a door that locked behind the telephone user. After having made his call, the user could escape only by depositing a coin in the doorlock. Only rarely did the early arrangements provide any means for refunding the user's payment in the event that the call could not be completed. An early attempt to remedy this difficulty relied on nothing more than a piece of string.

For many years, the common form of telephone pay station included several slots for the deposit of coins of varying denominations. A typical arrangement allowed the deposit of nickels, dimes and quarters so that payment of various amounts could be utilized in connection with the pay station. This arrangement was first used with so-called manual telephones in which often the initial deposit of a single coin worked to signal the operator that a call was sought to be placed. Additional coins were added for payment of calls of longer duration or for calls to long-distance locations. Internal arrangements of gongs transmitted various sounds back to the operator and gave the operator an indication of proper coin deposit.

Ultimately, telephone pay stations became dial operated, and an operator would normally not be required in order to place local calls. Various arrangements for actuating the equipment and for accepting and returning coins were developed, including, ultimately, electronic totalizers that were able to count and accurately register the number and denomination of coins deposited. Such totalizers also facilitated the development and utilization of so-called single-slot pay stations, wherein a single slot accepted coins of various denominations, eliminating the traditional three-slot design that had been utilized for many years.

Pay telephones that accept credit cards represent a much more recent development that has found widespread use within the past decade. Such arrangements, typically found in airports, railroad stations, etc., have been well received by business travelers, largely because credit-card telephones #mitigate the need to carry the many coins required to place telephone calls, particularly long-distance calls.

In the United States today, more people use public telephones more often than in any other country in the world, and the subsequent installation and adaptation of public telephones to different environments have been limited only by the imagination. As a result, significant experimentation, has been done in connection with the deployment of pay telephones in other than conventional environments. The deployment of telephone pay stations on railcars, particularly on deluxe passenger trains, has been experimented with from time to time. However, the most recent development and adaptation of the pay station have permitted use in commercial aircraft. Credit-card-accepting pay stations have been incorporated into commercial aircraft where, by means of radio-telephone links, telephone service can be made by the user from the commercial aircraft to ground-based telephone equipment.

With regard to the placement of telephone pay stations on board commercial aircraft, the telephones themselves have typically been installed on bulkheads located adjacent to flight-attendant stations. This arrangement requires the user to leave his seat to go to the location of the on-board pay station to initiate the call. If the pay station is equipped with a wireless telephone unit, the flight attendant often becomes involved in providing the user with the . hand-held telephone. Such arrangements fail to afford the convenience, and perhaps the privacy, that an aircraft passenger might desire in connection with the placement of a call.

Accordingly, it is an object of the present invention to provide a new and more effective telephone pay station for use on board in-flight commercial aircraft or in similar other vehicular environments where convenience of utilization and ready access facilitates and encourages use of such pay telephones.

DISCLOSURE OF THE INVENTION

The above and other objects, advantages, and capabilities are realized in conjunction with a hand-held, credit-card telephone for use aboard, for example, commercial aircraft, by a telephone holder and credit-card unlatching mechanism ("CCUM"). The holder includes a holder channel of generally longitudinal, stepwise construction. The holder also includes a face plate with a vertical slot for the insertion of a credit card. A butt plate, secured to one end of the holder channel, together with the CCUM, which is secured to the other end of the holder channel, form, with the holder channel, a telephone-receiving cavity in which the telephone is secured when not in use.

The CCUM itself includes a latch plate attached in alignment with the vertical slot in the face plate. A latching mechanism is secured to the holder channel and operates to selectively, in response to the insertion of a credit card, latch or unlatch the telephone from the telephone-receiving cavity. A credit-card guide is attached to the latch plate and is disposed between the latch plate and a latch-release plate of the latching mechanism for guiding the travel of a credit card that has been inserted in the slot.

BRIEF DESCRIPTION OF THE DRAWINGS

FIG. 2 is a front plan view of a telephone holder in accordance with the present invention.

FIG. 3 is a bottom plan view of a telephone holder in accordance with the present invention.

FIG. 4 is a sectional view taken along lines 4—4' of FIG. 2 showing, in phantom, a telephone in accordance with the present invention located within the confines of a holder in accordance with the present invention.

FIG. 5 is a right end view of a telephone holder in accordance with the present invention.

FIG. 6 is a left end view of a telephone holder in accordance with the present invention.

FIG. 7 is a perspective view of a hand-held pay station telephone in accordance with the present invention.

DESCRIPTION OF A PREFERRED EMBODIMENT

Figure 1:
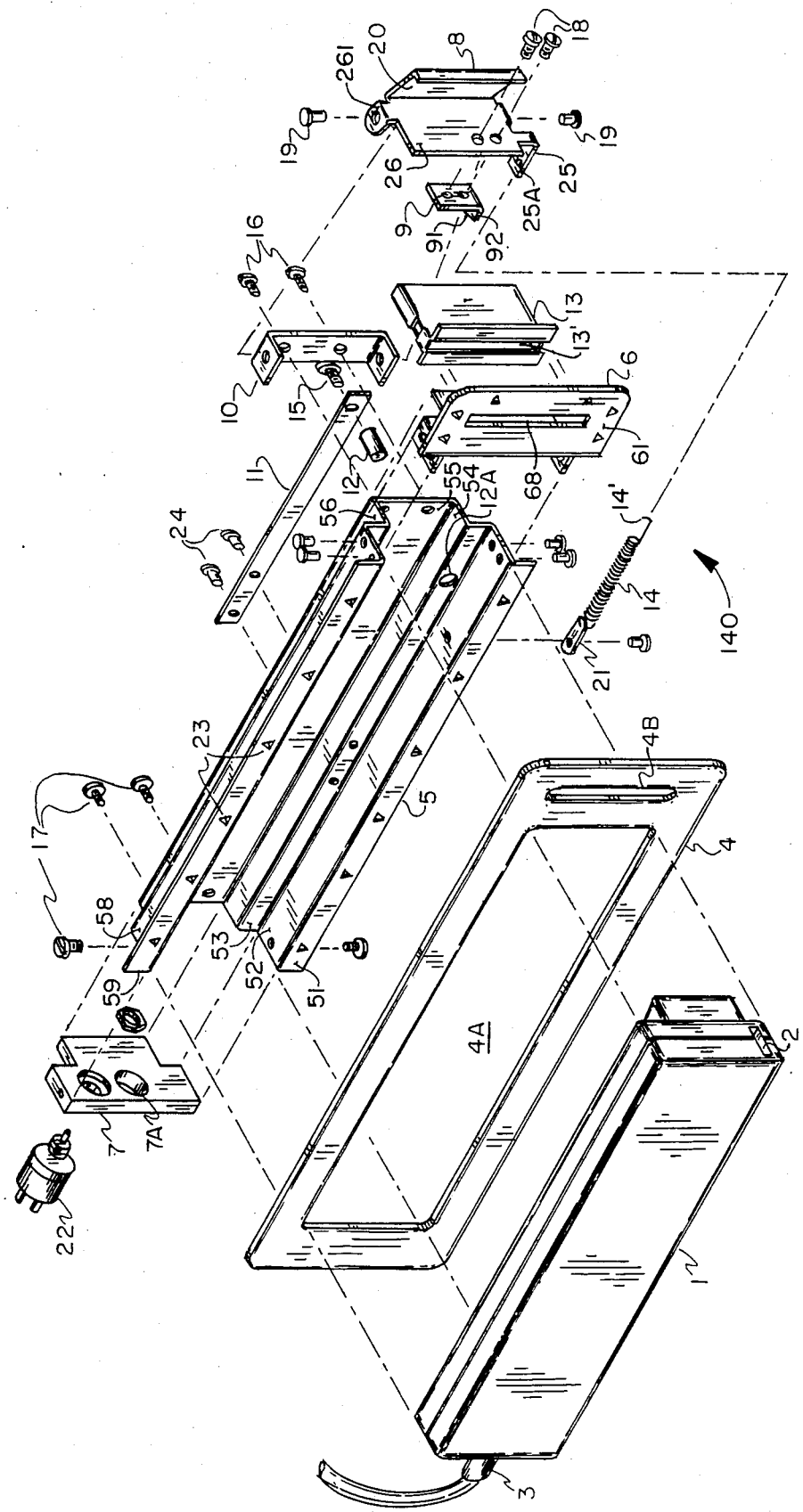
FIG. 1 is an exploded perspective view of a hand-held telephone pay station and the associated holder in accordance with the present invention.

Directing attention first to FIG. 1 and to FIG. 7, depicted therein are a telephone and a holder as contemplated in the present invention. Telephone 1 is of essentially unitary construction and is intended for hand-held operation. The telephone incorporates the familiar telephone functional components, including a transmitter, a receiver, a calling device and a line-matching network. However, inasmuch as the telephone and its incorporated components are not deemed to be constituent elements the present invention, they will not be discussed in detail.

Also provided at one end of the telephone, as may be seen in FIG. 1, is a latch-receiving recess 2. (In a manner that will be made clear below, latch-receiving recess 2 operates in conjunction with a latching mechanism 8 to secure the telephone in the holder when the telephone is not in use.) At the other end of the telephone, surrounding the associated telephone line cord, is a grommet 3 formed at least in part with the housing of telephone 1. Grommet 3 serves as, inter alia, a projection for assistance in maintaining the telephone in the associated holder.

Referring now to FIGS. 1 through 6, inclusive, the holder for the above-described telephone will now be described in detail. As may be readily seen from the exploded perspective view of FIG. 1, a bezel or face plate 4 is the only part of the holder that is visible to the telephone user. Face plate 4 is fabricated from relatively thin plate of metal, plastic, or similar material and exhibits a large, essentially rectangular, central opening 4A having length and width dimensions appropriate for the insertion of telephone 1. The telephone may be inserted through central opening 4A into a telephone-receiving cavity for retention when the telephone is not in use.

Also included in face plate 4 is a second opening or vertical slot 4B dimensioned so as to permit the insertion of a typical credit card. As will be described in detail below, the insertion of a credit card through opening 4B releases the latching mechanism, thereby facilitating the removal of the telephone from the telephone holder. The face plate 4 is attached to holder channel 5.

As may be seen readily by reference to FIG. 1, holder channel 5 is of a generally longitudinal, stepped construction, with the forwardmost portion of the holder channel dimensioned so as to accept telephone 1. Appurtenant to its stepped construction, holder channel 5 provides a multifaceted profile, as formed by surfaces 51 through 59, inclusive. Disposed along the upper and lower edges of the most forwardly projecting surfaces, 51 and 59, of holder channel 5 are a plurality of fabric-engaging projections, or teeth. The fabric-engaging projections, shown as elements 23 in FIG. 1, extend in a rearward direction and are intended for engaging the fabric or other material used in upholstering the seat of an aircraft or other vehicle in which the holder and telephone may be utilized. The nature of the particular fabric-engaging teeth may be also seen by further reference to FIG. 3.

In accordance with the present invention, the telephone-receiving cavity for telephone 1 is further defined at one end thereof by means of a latch plate 6 that is affixed as by rivets 24 to holder channel 5. Latch plate 6 includes a face portion 61 disposed in a plane that is parallel to the plane of face plate 4 and is orthogonal to the longitudinal direction of holder channel 5. Face portion 61 is adapted to be placed directly behind one end of face plate 4 in such a way that an opening, or vertical slot, 6B provided by latch plate 6 aligns directly with the credit-card #slot, or opening, 4B provided by face plate 4. Fastened to the rear portion of latch plate 6, directly behind opening 6B, is a credit-card guide 13 that, in a manner described below, properly aligns a credit card inserted through opening 4B with the latch-release mechanism. To this end, credit-card guide 13 provides an elongated compartment 131 that generally conforms to the profile of a credit card and thereby maintains proper alignment of and guides the travel of the credit card between vertical slot 6B and latch-release plate 20 of latching mechanism 8. As can be most readily observed in FIG. 4, latch-release plate 20 is integrally joined to major surface 26 and, with surface 26, forms a right-to-slightly-acute angle.

The other end of the telephone-receiving cavity is formed by a butt plate 7 attached to the end of the holder channel 5 opposite the end to which latch plate 6 is fastened. Butt plate 7 is fastened to the channel holder 5 by means of a plurality of attachment screws 17. Included in butt plate 7 is a hook switch 22. The hook switch 22 is spring loaded and is operated to the electrically open or "on-hook" position in response to the placement of a telephone 1 within the telephone-receiving cavity.

As can be seen in FIG. 1, the telephone-receiving cavity is formed by holder channel 5, latch plate 6 and butt plate 7. When the telephone is removed from the telephone-receiving cavity, the spring-loaded hook switch 22 operates to electrically connect the telephone, via the telephone line cord, to the associated telephone equipment. Also included in butt plate 7 is an opening 7A. Opening 7A acts in combination with the projecting grommet 3 to assist in the retention of the telephone 1 within the telephone-receiving cavity. Further details or understanding of the butt plate 7 can be had by reference to FIGS. 3, 4, and 6. Latch plate 6 and its structure and function can be best understood by reference to FIGS. 3, 4 and 5.

A latch-mounting bracket 10 is fastened to the rear of channel holder 5 by means of mounting screws 16. A latch mechanism 8 is pivotably mounted to the latch-mounting bracket 10 by means of pivot rivets 19. In a preferred embodiment, latch mechanism 8 includes a generally rectangular major surface 26. A pair of eyelets 261 are disposed at opposite sides of the perimeter of major surface 26 and extend orthogonally from it toward holder channel 5. As can be seen from FIG. 1, the pivot rivets are inserted through eyelets 261 and into latch-mounting bracket 10 so as to pivotably affix the latching mechanism to the holder channel. Latch mechanism 8 is positioned so as to extend over the rear portion of the credit-card guide 13.

The latch mechanism also includes a latch-retainer bracket 9 fastened, by virtue of screws 18, to the major surface 26 of latch mechanism 8. As can be readily seen by reference to FIG. 4, latch-retainer bracket 9 extends through an opening in latch plate 6 into the telephone-receiving cavity. As can be seen in FIG. 1 and FIG. 4, latch-retainer bracket 9 includes a flange portion 91 that exhibits an edge 92 inclined in a direction away from major surface 26, thereby facilitating the insertion of a telephone into the telephone-receiving cavity. When a telephone is positioned in the telephone-receiving cavity, latch-retainer bracket 9 readily engages recess 2 of telephone 1.

The latch mechanism 8, including latch-retainer bracket 9, is maintained in the closed or latching position by means of an attached, elongated coil spring 14. Spring 14 is attached, at one end, to the side of holder channel 5 by means of spring-attaching device 21. Spring 14 is attached at another end to latch mechanism 8 by means of a spring-retaining flange 25 that extends integrally from the bottom major surface 26. Spring-retaining flange 25 extends orthogonally from major surface 26 in a direction toward the holder channel and exhibits a circular aperture 25B for the engagement of an integral hamate extension 141 of spring 14. Elongated coil spring 14, including hamate portion 141, together with spring-attaching device 21, form a retention mechanism for predisposing the orientation of latching mechanism 8 so that latch-retainer bracket 9, and particularly flange portion 91, is positioned for insertion into latch-receiving recess 2 of telephone 1.

Also affixed to the telephone holder is an ejector mechanism that consists of resilient member in the form of a longitudinal leaf spring 11 secured a one end, as may be seen in FIG. 3, directly to a rearward portion of holder channel 5. At the other end of the ejector spring 11 is an ejector pin 12 which projects through an ejector aperture 5A in the holder channel 5. Ejector pin 12 is of rigid construction and is positioned to abut the rear portion of telephone 1 when the telephone is secured within the cavity. The ejector mechanism (specifically, spring 11 and ejector pin 12) operate to urge, in response to the insertion of a credit card by the telephone user, the telephone in a direction out of the telephone-receiving cavity.

The telephone holder of the present invention may be installed within an aircraft seat, bulkhead or similar environment, or perhaps in seats such as those included in limousines, boats, trains, and the like. Obviously, the particular technique of mounting the telephone holder, particularly by means of attaching the channel to the surrounding mounting environment, will vary substantially depending upon the particular utilization of the present arrangement. Thus, the specific details of mounting the telephone holder to the surrounding environment will not be dwelled upon, inasmuch as such mounting details may be readily arrived at by a practitioner of ordinary skill equipped with the description herein provided.

A more thorough understanding of the present invention may be had by means of the following description, which shall be offered again in conjunction with the above-described drawings. Particular attention will presently be directed to the manner in which the telephone is placed into the telephone holder, latched and retained in the telephone-receiving cavity, and then released for use by a telephone user.

With the telephone in the user's hand, the line cord will extend from the telephone into the telephone-receiving cavity and will exit the cavity by means of opening 7A in butt plate 7. The user inserts the end of the telephone that includes the line cord into the telephone-receiving cavity by placing the telephone through opening 4A of face plate 4. The line cord will be drawn through by means of an associated cord, or take-up, reel. At this point grommet 3, which extends from one end of telephone 1, is pressed into engagement with opening 7A in butt plate 7. The telephone is then further pressed through face plate 4 into the cavity formed by the telephone holder channel 5, latch plate 6, and butt plate 7. Adequate pressure of the telephone against spring-loaded latch mechanism 8, specifically, against inclined edge 92 of latch-retainer bracket 9, will initially cause latch mechanism 8 to pivot in a direction that causes latch-retainer bracket 9 to be withdrawn some distance from the telephone-receiving cavity. As the telephone is farther inserted into the telephone-receiving cavity, latch-retainer bracket 9 will come into alignment with latch-receiving recess 2. At this point, coil spring 14 will pull latch-retainer bracket 9 into recess 2, and the telephone will be engaged by both the projecting grommet 3 and by the latch-retainer bracket 9. The telephone will be thereby retained in the associated telephone holder, ready for subsequent use.

Should a telephone user desire to use the telephone, he would insert a credit card through the opening 4B in face plate 4. Once inserted through opening 4B, the credit card will then pass through the opening 6B in latch plate 6 and be guided in the direction of latch-release plate 20 by the elongated compartment 131 provided by credit card guide 13. Progress of the telephone in this direction ultimately is impeded by contact with the latch release plate 20 of latch mechanism 8. Moderate exertion by the user against the credit card forces the latch-release plate back, thereby overcoming the spring tension maintained by spring 14. As a result, latch mechanism 8 is caused to rotate about the pivots 19 and latch-retainer bracket 9 is withdrawn from the telephone-receiving cavity and, specifically, is withdrawn from recess 2 of telephone 1. At this point, ejector pin 12, affixed to ejector spring 11, will be forced in a forward direction through ejector aperture 5A in channel holder 5 against the rear portion of telephone 1, thereby causing a portion of the telephone to be forced forward and to protrude from the telephone holder. That is to say, leaf spring 11 is so tensioned that ejector pin 12 delivers pressure to the telephone in a direction that, absent the opposing force applied by the latch-release bracket, urges the telephone out of the telephone-receiving cavity. The user may now grasp telephone and manually withdraw it from the telephone holder.

By means of a credit-card reader that may be included in the telephone, the user obtains access to the associated telephone system. A pushbutton calling device included in the telephone permits the user to secure a connection with the desired telephone station. The particular details of the operation of the telephone itself to secure the telephone connection do not form a part of the present invention and, therefore, will not be described in more elaborate detail.

It is, however, useful to underscore some of the salient attributes of the subject Holder and Credit-Card Unlatching Mechanism. Its compact design and low-profile form factor permit installation in, for example, seatbacks of crowded commercial vehicles, where space is at a premium. A more bulky and cumbersome outline would likely militate against such convenient installation and discourage use of the on-board pay telephone. The compact design of the CCUM itself significantly contributes to the objective of providing a low-profile, readily installed apparatus. In addition, the fact that the CCUM is credit card actuated guards against the inadvertent release of the telephone handset in the cramped quarters typical of, for example, a commercial airliner.

Furthermore, it will be obvious to those skilled in the art that numerous modifications to the present invention can be made without departing from the scope of the invention as defined by the appended claims. In this context, it should be recognized that the essence of the invention resides in a low-profile, easily installed holder that defines a receiving cavity for a hand-held telephone. A CCUM, disposed in proximity with the holder, operates to secure a telephone in the cavity and requires the insertion of a credit card to release the telephone. The CCUM design comports with the low-profile, easily installed holder configuration.

We claim:

1. For a hand-held pay telephone, a holder and credit-card unlatching mechanism ("CCUM") comprising:
   (a) holder means for defining a telephone-receiving cavity for the placement of a hand-held telephone, said holder means comprising:
      a holder channel (5) of generally longitudinal, stepped construction;
      a face plate (4) attached to the holder at a forward-most portion of the holder; and
      a butt plate (7) secured to a first end of the holder;
   (b) a CCUM attached at a second end of the holder for defining, in conjunction with holder channel (5) and face plate (4), the telephone-receiving cavity and for selectively latching and unlatching a hand-held telephone in the telephone-receiving cavity in response to predetermined actions undertaken by a telephone user, wherein the handheld telephone is unlatched by inserting into the CCUM a predetermined implement.

2. A holder and CCUM as defined in claim 1, wherein the CCUM comprises:
   a latching mechanism pivotably attached to the holder channel, the latching mechanism including (i) a major surface, (ii) a latch-release plate joined to said major surface so as to form an acute angle with the major surface, and (iii) a latch-retainer bracket affixed to the major surface and including a flange portion for insertion into a latch-receiving recess in a hand-held telephone; and
   a latch plate attached to the holder channel and exhibiting a vertical slot in alignment with a vertical slot in the face plate, said slots for permitting the insertion of a credit card in the direction of the latch-release plate.

3. A holder and CCUM as defined in claim 2, wherein the CCUM further comprises a credit-card guide attached to the latch plate and disposed between the latch plate and the latch-release plate, said credit-card guide providing an elongated compartment generally conformal to the profile of a credit card for guiding the travel of a credit card between the vertical slot in the latch plate and the latch-release plate.

4. A holder and CCUM as defined in claim 3, wherein the CCUM further comprises retention means coupled between the holder channel and the latching mechanism for predisposing the orientation of the latching mechanism so that the latch-retainer bracket is positioned for insertion into a latch-receiving recess of a telephone.

5. A holder and CCUM as defined in claim 4, wherein the retention means comprises:
   a spring-attaching device attached to the holder channel;
   an elongated coil spring affixed at one end to the spring-attaching device; and
   a hamate portion integral to and extending at another end of the coil-spring, said hamate portion affixed to the latching mechanism.

6. A holder and CCUM as defined in claim 5, wherein the latching mechanism includes a spring-retaining flange extending orthogonally to the major surface in a direction toward the holder channel, said spring-retaining flange exhibiting an aperture for the insertion of the hamate portion of the retention means.

7. A holder and CCUM as defined in claim 6, further comprising an ejector mechanism comprising resilient means disposed at a rearward area of the holder channel for urging, in response to telephone-user activity, a telephone in a direction out of the telephone-receiving cavity.

8. A holder and CCUM as defined in claim 7, wherein the resilient means consists essentially of a leaf spring affixed at a first end to a rearward portion of the holder channel and an ejector pin attached at a second end of the leaf spring and aligned with an ejector aperture in the holder channel, wherein the leaf spring i tensioned to cause the ejector pin to apply pressure to a telephone in a direction that urges the telephone out of the telephone-receiving cavity.

9. A holder and CCUM as defined in claim 1, further comprising an ejector mechanism comprising resilient means disposed at a rearward area of the holder channel for urging, in response to telephone-user activity, a telephone in a direction out of the telephone-receiving cavity.

10. A holder and CCUM as defined in claim 9, wherein the CCUM comprises:
    a latching mechanism pivotably attached to the holder channel, the latching mechanism including (i) a major surface, (ii) a latch-release plate joined to said major surface so as to form an acute angle with the major surface, and (iii) a latch-release bracket affixed to the major surface and including a flange portion for insertion into a latch-receiving recess in a hand-held telephone; and
    a latch plate attached to the holder channel and exhibiting a vertical slot in alignment with a vertical slot in the face plate, said slots for permitting the insertion of a credit card in the direction of the latch-release plate.

11. A holder and CCUM as defined in claim 10, wherein the CCUM further comprises a credit-card guide attached to the latch plate and disposed between the latch plate and the latch-release plate, said credit-card guide providing an elongated compartment generally conformal to the profile of a credit card for guiding the travel of a credit card between the vertical slot in the latch plate and the latch release plate.

12. A holder and CCUM as defined in claim 11, wherein the CCUM further comprises retention means coupled between the holder channel and the latching mechanism for predisposing the orientation of the latching mechanism so that the latch-retainer bracket is positioned for insertion into a latch-receiving recess of a telephone.

13. A holder and CCUM as defined in claim 12, wherein the retention means comprises:
   a spring-attaching device attached to the holder channel;
   an elongated coil spring affixed at one end to the spring-attaching device; and
   a hamate portion integral to and extending at another end of the coil spring, said hamate portion affixed to the latching mechanism.

14. A holder and CCUM as defined in claim 13, wherein the latching mechanism includes a spring-retaining flange extending orthogonally to the major surface in a direction toward the holder channel, said spring-retaining flange exhibiting an aperture for the insertion of the hamate portion of the retention means.

15. A holder and CCUM as defined in claim 14, wherein the resilient means consists essentially of a leaf spring affixed at a first end to a rearward portion of the holder channel and an ejector pin attached at a second end of the leaf spring and aligned with an ejector aperture the holder channel, wherein the leaf spring is tensioned to cause the ejector pin to apply pressure to a telephone in a direction that urges the telephone out of the telephone-receiving cavity.

16. An apparatus for securing and selectively releasing a hand-held telephone, said apparatus comprising:
   an elongated, multifaceted holder channel;
   a butt plate affixed to the holder channel at a first end thereof;
   a latch plate affixed to a second end of the holder channel so that the holder channel, the butt plate, and the latch plate in cooperation define a telephone-receiving cavity, said latch plate exhibiting a vertical slot for the insertion of a credit card;
   a latching mechanism pivotably mounted on the holder channel about the second end of the holder channel;
   retention means attached between the holder channel and the latching mechanism for pivotably orienting the latching mechanism in the direction of the telephone receiving cavity; and
   an ejector mechanism disposed at a rearward area on the holder channel and aligned with an ejector aperture in the holder channel for urging a telephone in a forward direction, out of the telephone-receiving cavity.

17. An apparatus as defined in claim 16, further 1 comprising a credit-card guide disposed between the latch plate and the latching mechanism, said credit-card guide exhibiting a compartment in alignment with the vertical slot in the latch plate so as to predispose the travel of an inserted credit card in the direction of the latching mechanism.

18. An apparatus as defined in claim 16, wherein the latching mechanism comprises:
   a generally rectangular major surface;
   eyelets disposed at opposite ends of the major surface and extending toward the holder channel for pivotably affixing the latching mechanism to the holder channel;
   a latch-release plate integrally joined with the major surface and forming a slightly acute angle with the major surface; and
   a latch-retainer bracket affixed to the major surface and including a flange portion extending orthogonally from the major surface in the direction of the telephone-receiving cavity, said flange portion for insertion into a latch-receiving recess in a hand-held telephone.

19. An apparatus as defined in claim 16, wherein the retention means comprises:
   a spring-attaching device attached to the holder channel;
   an elongated coil spring affixed at a first end to the spring-attaching device; and
   a hamate portion integral to and extending at a second end of the coil spring, said hamate portion attached to the latching mechanism.

20. A holder and CCUM as defined in claim 19, wherein the latching mechanism includes a spring-retaining flange extending orthogonally to the major surface in a direction toward the holder channel, said spring-retaining flange exhibiting an aperture for the insertion of the hamate portion of the retention means.

21. An apparatus as defined in claim 16, wherein the ejector mechanism consists essentially of a leaf spring affixed at a first end to a rearward portion of the holder channel and an ejector pin attached at a second end of the leaf spring and aligned with an ejector aperture in the holder channel, wherein the leaf spring is tensioned to cause the ejector pin to apply pressure to a telephone in a direction that urges the telephone out of the telephone-receiving cavity.

22. An apparatus as defined in claim 17, wherein the latching mechanism comprises:
   a generally rectangular major surface;
   eyelets disposed at opposite ends of the major surface and extending toward the holder channel for pivotably affixing the latching mechanism to the holder channel;
   a latch-release plate integrally joined with the major surface and forming a slightly acute angle with the major surface; and
   a latch-retainer bracket affixed to the major surface and including a flange portion extending orthogonally from the major surface in the direction of the telephone-receiving cavity, said flange portion for insertion into a latch-receiving recess in a hand-held telephone.

23. An apparatus as defined in claim 17, wherein the retaining means comprises:
   a spring-attaching device attached to the holder channel;
   an elongated coil spring affixed at a first end to the spring-attaching device; and
   a hamate portion integral to and extending at a second end of the coil spring, said hamate portion attached to the latching mechanism.

24. A holder and CCUM as defined in claim 23, wherein the latching mechanism includes a spring-retaining flange extending orthogonally to the major surface in a direction toward the holder channel, said spring-retaining flange exhibiting an aperture for the insertion of the hamate portion of the retention means.

25. An apparatus as defined in claim 17, wherein the ejector mechanism consists essentially of a leaf spring affixed at a first end to a rearward portion of the holder channel and an ejector pin attached at a second end of the leaf spring and aligned with an ejector aperture in the holder channel, wherein the leaf spring is tensioned to cause the ejector pin to apply pressure to a telephone in a direction that urges the telephone out of the telephone-receiving cavity.

26. An apparatus as defined in claim 18, wherein the retention means comprises:
   a spring-attaching device attached to the holder channel;
   an elongated coil spring affixed at a first end to the spring-attaching device; and
   a hamate portion integral to and extending at a second end of the coil spring, said hamate portion #attached to the latching mechanism.

27. A holder and CCUM as defined in claim 26, wherein the latching mechanism includes a spring-retaining flange extending orthogonally to the major surface in a direction toward the holder channel, said spring-retaining flange exhibiting an aperture for the insertion of the hamate portion of the retention means.

28. An apparatus as defined in claim 18, wherein the ejector mechanism consists essentially of a leaf spring affixed at a first end to a rearward portion of the holder channel and an ejector pin attached at a second end of the leaf spring and aligned with an ejector aperture in the holder channel, wherein the leaf spring is tensioned to cause the ejector pin to apply pressure to a telephone in a direction that urges the telephone out of the telephone-receiving cavity.

29. A holder and CCUM as defined in claim 19, wherein the latching mechanism includes a spring-retaining flange extending orthogonally to the major surface in a direction toward the holder channel, said spring-retaining flange exhibiting an aperture for the insertion of the hamate portion of the retention means.

30. An apparatus as defined in claim 29, wherein the ejector mechanism consists essentially of a leaf spring affixed at a first end to a rearward portion of the holder channel and an ejector pin attached at a second end of the leaf spring and aligned with an ejector aperture in the hold channel, wherein the leaf spring is tensioned to cause the ejector prior to apply pressure to a telephone in a direction that urges the telephone out of the telephone-receiving cavity.

31. For operation in conjunction with a hand-held telephone and with a holder for the telephone, a credit-card unlatching mechanism ("CCUM") comprising:
   a latch plate disposed in proximity with the holder and providing an opening for the insertion of a credit card;
   a pivotably mounted latching mechanism disposed rearwardly from the opening in the latch plate and comprising a retaining member (9), the latching mechanism predisposed in a latching orientation with respect to the holder so hat the retaining member is positioned to secure a telephone in the holder;
   a retention mechanism attached between the holder and the latching mechanism for predisposing the latching mechanism in the above-mentioned latching orientation; and
   a credit-card guide interposed between the latch plate and the latching mechanism for guiding the travel of a credit card inserted through tee opening in the latch plate in the direction of the latching mechanism so that continued travel of the credit card results in its abutment with the latching mechanism and results in pivotal motion of the latching mechanism into an unlatching orientation whereby the retaining member is positioned to permit the release of a telephone from the holder.

32. A CCUM as defined in claim 31, wherein the latching mechanism comprises (i) a major surface (26), (ii) a latch-release plate (20) integrally joined to the major surface so as to form an acute angle with the major surface, and (iii) a retaining member in the form of a latch-retainer bracket that is affixed to the major surface and includes a flange portion for securing a telephone in the holder.

33. A CCUM as defined in claim 32, wherein the retention mechanism comprises:
   a spring-attaching device attached to the holder;
   an elongated coil spring affixed at one end to the spring-attaching device; and
   a hamate portion integral to and extending at another end of the coil-spring, said hamate portion affixed to the latching mechanism.

34. A CCUM as defined in claim 33, wherein the latching mechanism includes a spring-retaining flange extending orthogonally to the major surface in a direction toward the holder, said spring-retaining flange exhibiting an aperture for the insertion of the hamate portion of the retention mechanism.

35. A CCUM as defined in claim 34, wherein the credit-card guide provides an elongated compartment that is in alignment with the opening in the latch plate and is generally conformal to the profile of a credit card for guiding the travel of a credit card between the opening in the latch plate and the latch-release plate.

36. A CCUM as defined in claim 35, further comprising an ejector mechanism comprising resilient means disposed at a rearward area of the holder for urging, in response to the insertion or a credit card by a telephone user, a telephone in a direction out of the holder.

37. A CCUM as defined in claim 36, wherein the resilient means consists essentially of a leaf spring affixed at a first end to the holder and an ejector pin attached at a second end of the leaf spring and aligned with an ejector aperture the holder wherein the leaf spring is tensioned to cause the ejector pin to apply pressure to a telephone in a direction that urges the telephone out of the holder.

38. A CCUM as defined in claim 31, further comprising an ejector mechanism comprising resilient means disposed at a rearward area of the holder for urging, in response to the insertion or a credit card by a telephone user, a telephone in a direction out of 39. A CCUM as defined in claim 38, wherein the resilient means consists essentially of a leaf spring affixed at a first end to the holder and an ejector pin attached at a second end of the leaf spring and aligned with an ejector aperture the holder wherein the leaf spring is tensioned to cause the ejector pin to apply pressure to a telephone in a direction that urges the telephone out of the holder.

40. A CCUM as defined in claim 31, wherein the retention mechanism comprises
   a spring-attaching device attached to the holder;
   an elongated coil spring affixed at one end to the spring-attaching device; and
   a hamate portion integral to and extending at another end of the coil-spring, said hamate portion affixed to the latching mechanism.

41. A CCUM as defined in claim 40, wherein the latching mechanism includes a spring-retaining flange extending orthogonally to the major surface in a direction toward the holder, said spring-retaining flange exhibiting an aperture for the insertion of the hamate portion of the retention mechanism.

42. A CCUM as defined in claim 31, wherein the credit-card guide provides an elongated compartment that is in alignment with the opening in the latch plate and is generally conformal to the profile of a credit card for guiding the travel of a credit card between the opening in the latch plate and the latch-release plate.

43. A CCUM as defined in claim 31, wherein the latching mechanism comprises:
- a major surface to which the retaining member is 1 affixed, said major surface having a generally rectangular perimeter;
- a latch-release plate integrally joined to the major surface so as to form a right-to-slightly-acute angle with the major surface;
- eyelets disposed at opposite ends of the major surface and extending toward the holder for pivotably affixing the latching mechanism to the holder; and
- a spring-retaining flange extending from the major surface toward the holder, said spring-retaining flange for accommodating the attachment of the retention mechanism to the latching mechanism, and wherein the retaining member is in the form of a latch-release bracket that is affixed to the major surface and includes a flange portion (91) for securing a telephone in the holder.

44. A CCUM as defined in claim 43, wherein the flange portion exhibits and inclined edge (92), the edge inclined in a direction away from the major surface so as to facilitate the placement of a telephone in the holder.

* * * * *